2,824,887

Patented Feb. 25, 1958

2,824,887

SUBSTITUTED ETHYL ALKYL ISOTHIOCYANATES

Hein L. Klopping, Wilmington, Del., assignor to E. I. du Pont de Nemours and Company, Wilmington, Del., a corporation of Delaware No Drawing. Application February 25, 1954
Serial No. 412,659

8 Claims. (Cl. 260—454)

This invention relates to substituted ethyl alkyl isothiocyanates containing a central sulfur atom. More particularly, the invention is directed to beta-halo substituted ethyl mercapto alkyl isothiocyanates, beta-hydroxy substituted ethyl mercapto alkyl isothiocyanates, beta-halo substituted ethyl sulfinyl alkyl isothiocyanates, beta-hydroxy substituted ethyl sulfinyl alkyl isothiocyanates, beta-halo substituted ethyl sulfonyl alkyl isothiocyanates, and beta-hydroxy substituted ethyl sulfonyl alkyl isothiocyanates.

The compounds of my invention can be represented by the formula:

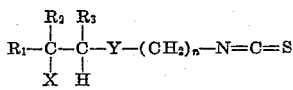

where $R_1$, $R_2$ and $R_3$ can be the same or different and represent hydrogen or an alkyl radical containing from 1 to 3 carbon atoms, Y is a divalent sulfur-containing group of the class consisting of S, SO, and $SO_2$, X is halogen or hydroxy radical, and $n$ is an integer of from 2 to 6.

In contrast to the bis-isothiocyanates of the prior art, the compounds of Formula 1 are readily soluble in such inexpensive solvents as ethylene chloride, methylene chloride, chloroform, dichloroethane, acetone, methyl ethyl ketone, benzene, and toluene. The sulfides of Formula 1 are also soluble in aliphatic hydrocarbons such as, for example, n-heptane.

Illustrative compounds of the present invention are shown below: This list, however, is not in any way limitative.

Isothiocyanic acid, 2-(2-hydroxyethylmercapto)-ethyl ester
Isothiocyanic acid, 2-(-2-chloroethylmercapto)-ethyl ester
Isothiocyanic acid, 2-(2-chloroethylsulfinyl)-ethyl ester
Isothiocyanic acid, 2-(2-chloroethylsulfonyl)-ethyl ester
Isothiocyanic acid, 2-(2-chloropropylsulfonyl)ethyl ester
Isothiocyanic acid, 2-(2-chloro-1-methylethylsulfonyl)-ethyl ester
Isothiocyanic acid, 2-(2-chloro-1-methylpropylsulfonyl)-ethyl ester
Isothiocyanic acid, 2-(2-bromo-1-methylbutylsulfonyl)-ethyl ester
Isothiocyanic acid, 2-(2-chloro-2-methylbutylsulfonyl)-ethyl ester
Isothiocyanic acid, 2-(2-chloro-1,2-dimethylpropylsulfonyl)ethyl ester
Isothiocyanic acid, 2-(2-chlorobutylsulfonyl)ethyl ester
Isothiocyanic acid, 2-(2-chloro-1-methylpentylsulfonyl)-ethyl ester
Isothiocyanic acid, 2-(2-fluoroethylsulfonyl)ethyl ester
Isothiocyanic acid, 2-(2-iodethylsulfonyl)-ethyl ester
Isothiocyanic acid, 3-(2-chloropropylmercapto)-n-propyl ester
Isothiocyanic acid, 2-(2-chloro-2-methylpropylsulfinyl)-ethyl ester
Isothiocyanic acid, 2-(2-bromo-1-methylbutylsulfinyl)-ethyl ester
Isothiocyanic acid, 6-(2-hydroxyethylsulfonyl)hexyl ester
Isothiocyanic acid, 4-(2-hydroxy-2-methylpropylsulfonyl)-butyl ester The compound of Formula 1 can be prepared from known organic compounds by any of a variety of methods.

For purposes of illustration, a schematic outline of a practical method of preparing compounds where $R_1$, $R_2$ and $R_3$ are hydrogen, $n$ is 2 and X is chlorine is shown hereafter. This method is, of course, applicable to all species falling within generic claim 1.

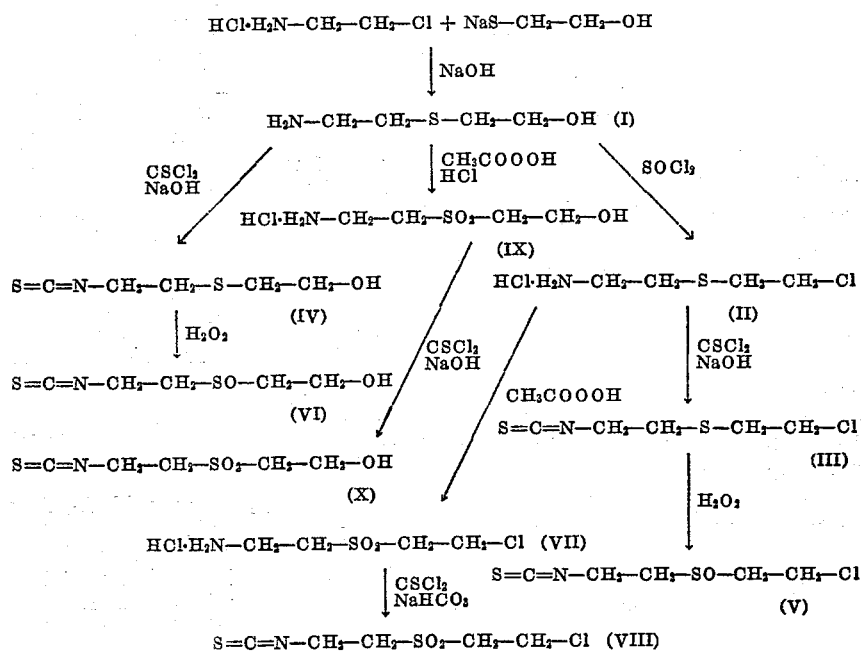

The starting materials, beta-chloroethylamine hydrochloride and beta-mercaptoethanol, and two intermediate compounds, identified above as I and II, are known.
beta-Chloroethylamine hydrochloride can be prepared from ethanolamine and concentrated hydrochloric acid at a temperature of 150–160° C. [Ber. 38, 3130 (1905)] or from ethanolamine hydrochloride and $SOCl_2$ [J. Am. Chem. Soc. 63, 3125 (1941)]. beta-Mercaptoethanol is most conveniently prepared from ethylene oxide and hydrogen sulfide.

The compounds identified as III, IV, V, VI, VIII and X are products of the present invention. Of these compounds, I prefer the sulfoxides (V and VI) over the sulfides (III and IV) and the sulfones (VIII and X) over the sulfoxides.

Broadly speaking, I prefer the sulfones of Formula 1 over the sulfoxides and sulfides of Formula 1. The sulfides are the least preferred species. The ethyl esters are preferred to the higher esters and the halogenated compounds, particularly the chloro substituted ones, are preferred over the hydroxy derivatives.

As previously indicated, the same series of reactions as shown in the above scheme may be used for the preparation of the compounds of Formula 1 where $R_1$, $R_2$ and $R_3$ are alkyl groups and $n$ is an integer of 2 or more. The starting materials may be represented as follows:

2.
$$HO-\underset{\underset{R_2}{|}}{\overset{\overset{R_1}{|}}{C}}-\underset{\underset{H}{|}}{\overset{\overset{R_3}{|}}{C}}-SH$$

and

3. $\quad Cl-(CH_2)_n NH_2 \cdot HCl$ where $R_1$, $R_2$, $R_3$ and $n$ have the same significance as in Formula 1.

The mercapto alcohols of Formula 2 may be prepared by a variety of known methods. One method comprises refluxing the chloro compound 4.
$$HO-\underset{\underset{R_2}{|}}{\overset{\overset{R_1}{|}}{C}}-\underset{\underset{H}{|}}{\overset{\overset{R_2}{|}}{C}}-Cl$$

with NaSH in alcohol. An alternative method comprises the steps shown in the following diagram:

$$R_1-\underset{\underset{}{}}{\overset{\overset{R_2 \; R_3}{| \; |}}{C=CH}} \xrightarrow{AcOOH} R_1-\underset{O}{\underset{\diagdown \diagup}{\overset{R_2}{\overset{|}{C}}\text{———}\overset{R_3}{\overset{|}{C}}-H}} \xrightarrow{H_2S} R_1-\underset{\underset{OH}{|}}{\overset{\overset{R_2}{|}}{C}}-\underset{\underset{H}{|}}{\overset{\overset{R_3}{|}}{C}}-SH$$

$$\downarrow CH_3COSH \quad \diagup HCl$$

$$R_1-\underset{\underset{OH}{|}}{\overset{\overset{R_2}{|}}{C}}-\underset{\underset{H}{|}}{\overset{\overset{R_3}{|}}{C}}-SCOCH_3$$

In those instances where a compound of Formula 2 is to be prepared having $R_2$ and $R_3$ hydrogen and $R_1$ alkyl, the synthesis steps are as follows:

$$R_1-\overset{\overset{H}{|}}{C}=CH_2 \xrightarrow{AcOOH} R_1-\underset{O}{\underset{\diagdown \diagup}{\overset{H}{\overset{|}{C}}\text{———}CH_2}} \xrightarrow[\text{or } CH_3COSH \text{ and } HCl]{H_2S}$$

$$R_1\overset{\overset{H}{|}}{\underset{\underset{OH}{|}}{C}}-CH_2-SH$$

The sulfur adds exclusively to the alpha carbon atom.

Compounds of Formula 2 wherein $R_3$ is alkyl and $R_1$ and $R_2$ are hydrogen can be prepared in accordance with the scheme:

$$CH_2=\overset{\overset{R_3}{|}}{C}-H \xrightarrow{AcOOH} \underset{O}{\underset{\diagdown \diagup}{CH_2\text{—}\overset{\overset{R_3}{|}}{C}H}} \xrightarrow{thiourea} \underset{S}{\underset{\diagdown \diagup}{CH_2\text{—}\overset{\overset{R_3}{|}}{C}H}} \xrightarrow[pyridine]{Ac_2O}$$

$$AcOCH_2-\overset{\overset{R_3}{|}}{\underset{\underset{SAc}{|}}{C}}-H \xrightarrow{HCl} HOCH_2-\overset{\overset{R_3}{|}}{\underset{\underset{SH}{|}}{C}}-H$$

Still other methods of preparing compounds of Formula 2 involve the use of olefins of the general formulae 5. $\quad R_1-\overset{\overset{}{}}{\underset{\underset{R_2}{|}}{C}}=CH_2$ and 6.
$$R_1-\overset{\overset{H}{|}}{C}=\overset{\overset{H}{|}}{C}-R_3$$

Olefins of Formula 5 yield mercapto alcohols of the formula $$R_1-\underset{\underset{OH}{|}}{\overset{\overset{R_2}{|}}{C}}-CH_2SH$$

while those of Formula 6 yield a mixture of $$R_1-\underset{\underset{OH}{|}}{\overset{\overset{H}{|}}{C}}\text{——}\underset{\underset{SH}{|}}{\overset{\overset{H}{|}}{C}}-R_3 \quad \text{and} \quad R_1-\underset{\underset{SH}{|}}{\overset{\overset{H}{|}}{C}}\text{——}\underset{\underset{OH}{|}}{\overset{\overset{H}{|}}{C}}-R_3$$

These two components can be separated by distillation.

The chloroalkylamine of Formula 3 can also be prepared by one of several methods. For example, 6-chloro-1-aminohexane hydrochloride can be prepared from 1,6-dichlorohexane and potassium phthalimide.

The initial condensation between the beta-mercapto alcohol of Formula 2 is preferably effected in the presence of two equivalents of a base, such as, for example, sodium hydroxide or potassium hydroxide. One equivalent serves to neutralize the amino hydrochloride to the free amine, the second equivalent converts beta-mercapto-alkanol to its metal salt.

The condensation is preferably carried out in a solvent in which both reactants are soluble such as, for example, a lower alkanol. 95% ethanol is a particularly preferred solvent. The reaction proceeds well at the reflux temperature of ethanol. The by-product of the reaction, sodium chloride, can be removed by simple filtration. Water may also be employed as a solvent.

The quantity of solvent may vary within rather wide limits. At least enough should be present such that stirring is not impeded by the precipitating sodium chloride.

The second step in my general process of preparing the products of this invention involves the replacement of a hydroxy group by chlorine. Any of several methods may be employed to effect this replacement. Compound I can, for example, be reacted with concentrated aqueous hydrochloric acid, preferably at a temperature slightly higher than the reflux temperature of concentrated hydrochloric acid, say, at about 150–160° C.

Alternatively, compound I, or generically speaking, omega-hydroxyalkyl-omega-aminoalkyl sulfide, can be refluxed with thionyl chloride or phosphorus pentachloride in an organic solvent such as, for instance, chloroform. In these alternative methods, protection of the free amino group by first converting it to an amine hydrochloride group by means of gaseous hydrogen chloride is advantageous but not essential.

For the preparation of the other halogen substituted analogs of II from I, such agents as for example aqueous hydrobromic acid, aqueous hydroiodic acid, thionyl bromide, or phosphorus pentabromide can be employed.

The oxidation of a sulfide of the formula $$S=C=N-(CH_2)_n-S-\underset{\underset{X}{|}}{\overset{\overset{R_3}{|}}{C}}-\underset{\underset{}{}}{\overset{\overset{R_1}{|}}{C}}-R_2$$
$$\qquad\qquad\qquad\qquad H$$

where $n$, $X$, $R_1$, $R_2$ and $R_3$ have the same significance as in Formula 1, to the corresponding sulfoxide is preferably effected in acetic acid using hydrogen peroxide. For optimum yield the reaction mixture should be maintained at 25–35° C., although satisfactory yields are obtained over a much wider range, say, from about 15° C. to the reflux temperature of acetic acid. It is preferred practice to dilute 30% hydrogen peroxide with approximately an equal volume of acetic acid and add this mixture dropwise to a solution of the aforementioned sulfide in acetic acid. The formation of tarry by-product can be substantially eliminated by avoiding an excess of hydrogen peroxide.

The oxidation of sulfide sulfur in a compound having the formula

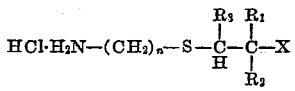

to a sulfone can also be effected with hydrogen peroxide, preferably by adding the theoretical amount of hydrogen peroxide in 10% aqueous solution to an aqueous solution of the sulfide at a temperature below 40° C. The sulfone can then be reacted with thiophosgene. Oxidation of a sulfide (II) to a sulfone (VII) can also be effected satisfactorily using dilute peracetic acid in aqueous medium at temperatures below 3°.

The replacement of an amino group by an isothiocyano is effected by use of $CSCl_2$ and NaOH. This step corresponds on the schematic diagram to the conversion of I to IV, II to III, IX to X and VII to VIII. When the compound identified as VII is subjected to $CSCl_2$ and NaOH, a mixture of VIII and a vinyl derivative, which is described in my copending application Serial No. 412,660, now U. S. Patent No. 2,785,190 filed concurrently herewith, is obtained. If an excess of sodium hydroxide is used, complete dehydrohalogenation of the intermediate VIII takes place. I have found surprisingly that dehydrohalogenation can be completely prevented by replacing sodium hydroxide by sodium bicarbonate.

When compound II or an omega-chloroalkyl-omega-aminoalkyl sulfide hydrochloride is treated with thiophosgene and base, dehydrohalogenation does not take place.

As indicated above, the compounds of my invention are readily soluble in chlorinated hydrocarbons such as, for instance, chloroform, methylene chloride, dichloroethane, and the like. They are also very soluble in benzene, toluene, acetone and methyl ethyl ketone. They are, however, insoluble in water.

The compounds of the present invention are highly potent fungicides, insecticides and miticides. They are particularly useful in the control of fungus attack on seeds, plants, and vegetable crops and on other materials. They find further use as pre-harvest dehydrating or wilting agents. At concentrations higher than those which afford complete control of fungal diseases of plants and crops, my compounds exert an unexpected type of herbicidal activity. Leaves treated with the compounds dehydrate, collapse but remain green.

In order to better understand the nature of my invention, reference should be had to the following illustrative examples:

EXAMPLE 1

*Preparation of isothiocyanic acid, 2-(2-hydroxyethyl-mercapto)ethyl ester*

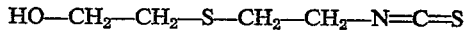

To a solution of 368 g. of 85% potassium hydroxide in 2 liters of 95% ethyl alcohol, there is added 219 g. of beta-mercaptoethanol. The solution is stirred and refluxed as 327 g. of beta-chloroethylamine hydrochloride, dissolved in 700 ml. of 95% ethyl alcohol, are added over a period of one hour. The reaction mixture is stirred for a period of 5 hours. After the mixture is allowed to stand overnight, it is filtered. The potassium chloride on the filter is washed with alcohol, and the filtrate is combined with the washings. The alcohol is removed from the filtrate by evaporation in vacuo, and the oil residue is distilled under a high vacuum. The fraction boiling at 110–120°/0.9 mm. is collected and redistilled to give beta-aminoethyl-beta-hydroxyethyl sulfide. It is a colorless oil, B. P. 105–108°/0.15 mm., $n_D^{25}=1.5282$.

A solution of 12.1 grams of beta-hydroxyethyl-beta-aminoethyl sulfide in 110 ml. of water is cooled in ice and stirred. Ten mls. of concentrated hydrochloric acid and a solution of 115 g. of thiophosgene in 120 ml. of chloroform are added to the cooled sulfide solution. Into the resulting mixture there is added dropwise a solution of 12 grams of sodium hydroxide in 60 ml. of water. The pH of the reaction mixture is kept below 7 during the dropwise addition of base. When the mixture no longer turns acidic, addition of base is stopped. The neutralized mixture is stirred for a period of about one hour.

The chloroform layer is separated, and combined with the chloroform washing of the aqueous layer. The combined chloroform extract is dried over anhydrous sodium sulfate, treated with Darco and filtered. The filtrate is evaporated to dryness. The residue is a yellow oil and consists essentially of 2-(2-hydroxyethyl-mercapto)ethyl isothiocyanate.

*Analysis.*—Calcd. for $C_5H_9ONS_2$: C 36.78, H 5.55, N 8.58, S 39.28. Found: C 36.82, H 5.74, N 8.62, S 39.29.

EXAMPLE 2

*Preparation of isothiocyanic acid, 2-(2-chloroethyl-mercapto)ethyl ester*

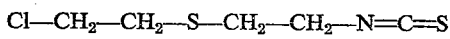

A solution consisting of 181.7 g. of beta-hydroxyethyl-beta-aminoethyl sulfide (prepared as in Example 1) in 1800 ml. of chloroform is stirred and heated to reflux. A solution of 357 g. of thionyl chloride in 220 ml. of chloroform is added dropwise. The reaction mixture is refluxed gently during the thionyl chloride addition. The addition takes three hours. After the mixture has stood overnight, the solid is collected on a filter, washed with chloroform, and dried. The resulting beta-chloroethyl-beta-aminoethyl sulfide hydrochloride melts at 77°–79° C.

A solution of 17.6 g. of beta-chloroethyl-beta-aminoethyl sulfide hydrochloride in 170 ml. of water is cooled in ice. A solution of 11.5 g. of thiophosgene in 170 ml. of chloroform is added all at once. While the mixture is stirred, a solution of 12 g. of sodium hydroxide in 60 ml. of water is added dropwise until the mixture no longer turns acidic on stopping the addition of base. Stirring is continued for one hour. Then the chloroform layer is separated, combined with chloroform washings of the aqueous layer, dried over anhydrous sodium sulfate, treated with Darco, filtered, collected and evaporated to dryness in vacuo. The oily residue is distilled in vacuo. The light yellow liquid consisting essentially of isothiocyanic acid, 2-(2-chloroethylmercapto)ethyl ester boiling at 116–118°/1 mm. is collected.

*Analysis.*—Calcd. for $C_5H_8NS_2Cl$: C 33.05, H 4.43, N 7.71. Found: C 33.21, H 4.57, N 7.74.

EXAMPLE 3

*Preparation of isothiocyanic acid, 2-(2-chloroethylsulfinyl) ethyl ester*

A solution of 15 g. of isothiocyanic acid, 2-(2-chloroethylmercapto) ethyl ester (prepared as in Example 2) in 75 ml. of glacial acetic acid is stirred. A solution of 11.5 g. of 29% hydrogen peroxide in 11.5 ml. of glacial acetic acid is added dropwise over a period of one hour. The temperature of the mixture is kept at 30°. Stirring of the mixture is continued for five hours. Then the solution is vacuum concentrated to an oil. The oil crystallizes on prolonged cooling in ice. The crystals are purified by dissolving in chloroform at room temperature, adding carbon tetrachloride until the solution becomes cloudy, and cooling in ice. The purified crystals of the desired ester melt at 55–58° C.

*Analysis.*—Calcd. for $C_5H_8ONS_2Cl$: C 30.37, H 4.08, N 7.08, S 32.43. Found: C 30.72, H 4.08, N 7.18, S 32.47.

EXAMPLE 4

*Preparation of isothiocyanic acid, 2-(2-chloroethylsulfonyl) ethyl ester*

A solution of 58 g. beta-chloroethyl-beta-amino-ethyl sulfide hydrochloride (prepared as in Example 2) in 600 ml. of water is stirred and cooled in an ethanol-ice mixture. A sloution of 107 ml. of 40% peracetic acid in 600 ml. of water is added dropwise. The temperature of the reaction mixture is kept below 3°. The addition takes 75 minutes. The mixture is stirred for one hour at temperatures below 3°, then the temperature of the mixture is allowed to rise slowly to room temperature while it is stirred for four additional hours. After the mixture has stood overnight, it is vaccum concentrated to a syrup. This syrup is cooled in ice and rubbed with acetone until crystallization is complete. The oily crystals melt at 130–140°. After recrystallization from 400 ml. of a 1:1 mixture of absolute alcohol and 95% ethyl alcohol, the crystals of beta-chloroethyl-beta-aminoethyl sulfone hydrochloride melt at 153–155° C.

*Analysis.*—Calcd. for $C_4H_{11}O_2NSCl_2$: C 23.08, H 5.28, N 6.73. Found: C 23.26, H 5.33, N 6.72.

A solution of 34 g. of beta-chloroethyl-beta-aminoethylsulfone hydrochloride in 340 ml. of water is stirred and cooled in ice. A solution of 14 ml. of thiophosgene in 340 ml. of chloroform is added in a single batch. Then a solution of 41 g. of sodium bicarbonate in 440 ml. of water is added dropwise over a period of three hours. The pH of the reaction mixture is kept below 7 at all times.

The chloroform layer is separated, combined with chloroform washings of the aqueous layer, dried over anhydrous sodium sulfate, treated with Darco, filtered, collected, and vacuum concentrated to dryness. The residue, a pale yellow oil, crystallizes on standing. The crystals are ground with *n*-hexane, filtered off and dried. The crystalline product, which is isothiocyanic acid, 2-(2-chloroethylsulfonyl) ethyl ester, melts at 53.5–54° C.

*Analysis.*—Calcd. for $C_5H_8O_2NS_2Cl$: C 28.10, H 3.73, N 6.55, S 30.01, Cl 16.59. Found: C 28.35, H 3.96, N 6.62, S 30.38, Cl 16.63.

I claim:

1. A compound having the formula

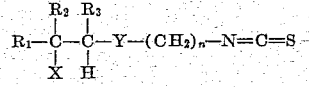

where $R_1$, $R_2$ and $R_3$ are members of the class consisting of hydrogen and alkyl radicals having from 1 to 3 carbon atoms, X is a member of the group consisting of halogen and hydroxy radicals, Y is a divalent radical of the class consisting of S, SO, and $SO_2$, and $n$ is an integer of from 2 to 6.

2. A compound of the formula

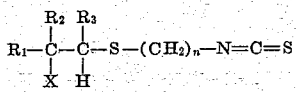

where $R_1$, $R_2$ and $R_3$ are members of the class consisting of hydrogen and alkyl radicals having from 1 to 3 carbon atoms, X is a member of the group consisting of halogen and hydroxy radicals, and $n$ is an integer of from 2 to 6.

3. A compound of the formula

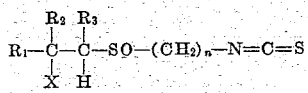

where $R_1$, $R_2$ and $R_3$ are members of the class consisting of hydrogen and alkyl radicals having from 1 to 3 carbon atoms, X is a member of the group consisting of halogen and hydroxy radicals, and $n$ is an integer of from 2 to 6.

4. A compound of the formula

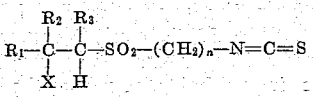

where $R_1$, $R_2$ and $R_3$ are members of the class consisting of hydrogen and alkyl radicals having from 1 to 3 carbon atoms, X is a member of the group consisting of halogen and hydroxy radicals, and $n$ is an integer of from 2 to 6.

5. Isothiocyanic acid, 2-(2-hydroxyethylmercapto)-ethyl ester.

6. Isothiocyanic acid, 2-(2-chloroethylmercapto)-ethyl ester.

7. Isothiocyanic acid, 2-(2-chloroethylsulfinyl)-ethyl ester.

8. Isothiocyanic acid, 2-(2-chloroethylsulfonyl)-ethyl ester.

References Cited in the file of this patent

UNITED STATES PATENTS

| | | |
|---|---|---|
| 2,139,335 | Shoemaker | Dec. 6, 1938 |
| 2,372,809 | Bruson | Apr. 3, 1945 |
| 2,394,915 | Jones | Feb. 12, 1946 |

FOREIGN PATENTS

| | | |
|---|---|---|
| 822,389 | Germany | Nov. 26, 1951 |

OTHER REFERENCES

Dyson: Org. Synthesis, coll. vol. I (1941), page 165.

U. S. DEPARTMENT OF COMMERCE
PATENT OFFICE

CERTIFICATE OF CORRECTION

Patent No. 2,824,887                           February 25, 1958

Hein L. Klopping

It is hereby certified that error appears in the printed specification of the above numbered patent requiring correction and that the said Letters Patent should read as corrected below.

Column 1, line 27, before the formula insert the number "1."; column 2, line 23, for "2-(2-iodethylsulfonyl)-" read -- 2-(2-iodoethylsulfonyl)- --; column 7, line 14, for "vaccum" read -- vacuum --.

Signed and sealed this 20th day of May 1958.

(SEAL)
Attest:
KARL H. AXLINE
Attesting Officer

ROBERT C. WATSON
Commissioner of Patents